US012039503B2

(12) United States Patent
Egidi et al.

(10) Patent No.: US 12,039,503 B2
(45) Date of Patent: Jul. 16, 2024

(54) FOOD PACKAGE RECYCLING APPARATUS AND METHOD

(71) Applicant: Tetra Laval Holdings & Finance S.A., Pully (CH)

(72) Inventors: Sara Egidi, Ascoli Piceno (IT); Gabriele Borelli, Spilamberto (IT); Riccardo Trovato Battagliola, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 171 days.

(21) Appl. No.: 17/441,838

(22) PCT Filed: Mar. 17, 2020

(86) PCT No.: PCT/EP2020/057167
§ 371 (c)(1),
(2) Date: Sep. 22, 2021

(87) PCT Pub. No.: WO2020/200744
PCT Pub. Date: Oct. 8, 2020

(65) Prior Publication Data
US 2022/0188777 A1    Jun. 16, 2022

(30) Foreign Application Priority Data
Mar. 29, 2019   (EP) .................................... 19166290

(51) Int. Cl.
*G06Q 10/30*     (2023.01)
*G06K 19/07*     (2006.01)

(52) U.S. Cl.
CPC ......... *G06Q 10/30* (2013.01); *G06K 19/0723* (2013.01)

(58) Field of Classification Search
CPC .... G06Q 10/30; G06Q 10/08; G06K 19/0723; Y02W 90/00
See application file for complete search history.

(56) References Cited

U.S. PATENT DOCUMENTS 4,512,253 A  *  4/1985  La Barge .............. G07F 7/0609
                                                      100/351
7,299,982 B2 * 11/2007  Kreiner .................. G06Q 10/08
                                                      235/375
(Continued)

FOREIGN PATENT DOCUMENTS

CA      2926097 A1 *   4/2010   ............. G06Q 10/30
CA      3043883 A1 *   5/2018   ............. G06Q 10/00
(Continued)

OTHER PUBLICATIONS

Anonymous "Lakeshore Recycling Systems Awarded the Coveted Illinois Governor's Sustainability Award for Innovative Business Practices," Internet Wire, pp. NA, 2017 (Year: 2017).*
(Continued)

*Primary Examiner* — Gerardo Araque, Jr.
(74) *Attorney, Agent, or Firm* — Knobbe, Martens, Olson & Bear, LLP

(57) ABSTRACT

A method for tracing a food package for assuring efficient recycling is provided. The method comprises establishing a first communication session between the food package and a user device, receiving a user identification associated to the user device, receiving a package identification from a package identification device provided in the food package, establishing a second communication session between the food package and a package collecting device receiving a PCD identification from the package collecting device determining package material associated with the food package by using the package identification, determining recycling material associated with the package collecting device by (Continued)

using the PCD identification, in case the package material and the recycling material match, in case a package disposal is detected by the package collecting device, registering a recycling confirmation to a user account associated with the user identification.

9 Claims, 8 Drawing Sheets

(56) References Cited

U.S. PATENT DOCUMENTS

| | | | | |
|---|---|---|---|---|
| 8,862,495 | B2* | 10/2014 | Ritter | G06Q 20/3227 |
| | | | | 705/14.1 |
| 9,090,399 | B2* | 7/2015 | Sundholm | G06Q 10/30 |
| 9,790,024 | B2* | 10/2017 | Sundholm | G06Q 10/08 |
| 2004/0129781 | A1* | 7/2004 | Kreiner | G06Q 10/08 |
| | | | | 235/385 |
| 2004/0193438 | A1* | 9/2004 | Stashluk, Jr. | G06Q 30/02 |
| | | | | 705/304 |
| 2006/0069588 | A1* | 3/2006 | Ritter | G06Q 20/10 |
| | | | | 705/308 |
| 2006/0167580 | A1* | 7/2006 | Whittier | B29B 17/02 |
| | | | | 700/116 |
| 2007/0174071 | A1* | 7/2007 | Hunscher | G06Q 10/30 |
| | | | | 705/308 |
| 2008/0125901 | A1* | 5/2008 | Fleischer | G06Q 10/08 |
| | | | | 700/215 |
| 2009/0024479 | A1* | 1/2009 | Gonen | G06Q 30/00 |
| | | | | 705/14.1 |
| 2010/0312601 | A1* | 12/2010 | Lin | G06Q 10/08 |
| | | | | 705/308 |
| 2011/0000402 | A1* | 1/2011 | Grasso, Jr. | C04B 28/04 |
| | | | | 106/713 |
| 2011/0225098 | A1* | 9/2011 | Wolff | G06Q 30/02 |
| | | | | 705/308 |
| 2011/0258128 | A1* | 10/2011 | Hambleton | G06Q 30/02 |
| | | | | 705/308 |
| 2013/0030988 | A1* | 1/2013 | Mayo | G06Q 10/30 |
| | | | | 705/39 |
| 2013/0075468 | A1* | 3/2013 | Wadden | G06Q 10/087 |
| | | | | 235/379 |
| 2013/0297518 | A1* | 11/2013 | Nassar | G06Q 10/30 |
| | | | | 705/308 |
| 2013/0332237 | A1* | 12/2013 | Lyle | G06Q 30/0205 |
| | | | | 705/7.34 |
| 2014/0012764 | A1* | 1/2014 | Kruglick | G06Q 10/30 |
| | | | | 705/308 |
| 2015/0235185 | A1* | 8/2015 | Hunscher | G06Q 99/00 |
| | | | | 235/375 |
| 2016/0371738 | A1* | 12/2016 | Berry | G06Q 30/0276 |
| 2017/0011362 | A1* | 1/2017 | Whitman | B65D 21/086 |
| 2017/0116654 | A1* | 4/2017 | Atwood | G06Q 10/30 |
| 2017/0124643 | A1 | 5/2017 | Haimi et al. | |
| 2017/0242980 | A1* | 8/2017 | Barrington | G16H 10/40 |
| 2017/0372273 | A1* | 12/2017 | Bowles | G06Q 30/0278 |
| 2020/0189844 | A1* | 6/2020 | Sridhar | G06Q 30/0226 |

FOREIGN PATENT DOCUMENTS

| | | | | |
|---|---|---|---|---|
| EP | 1266830 | A1 | 12/2002 | |
| EP | 1722322 | A2 * | 11/2006 | G06K 17/0022 |
| JP | 2004526644 | A * | 9/2004 | G06Q 10/083 |
| JP | 2007528830 | A * | 10/2007 | G06Q 10/18 |
| JP | 2018/041234 | A | 3/2018 | |
| WO | WO-2005001744 | A2 * | 1/2005 | G06K 19/0716 |
| WO | WO-2007108913 | A2 * | 9/2007 | B65F 1/1484 |
| WO | WO-2010056287 | A1 * | 5/2010 | G06F 19/366 |
| WO | WO-2013184217 | A1 * | 12/2013 | G06Q 10/30 |
| WO | WO-2014007792 | A1 * | 1/2014 | G06Q 10/1093 |
| WO | WO-2019169852 | A1 * | 9/2019 | |

OTHER PUBLICATIONS

W. Penga and D. Sub, Development of an Online System for Recycling Consumer Electronic Products using the Internet, Nfc and Rfid Technologies. 2014 DOI: http://dx.doi.org/10.4028/www.scientific.net/KEM.572.90. (Year: 2014).*

J. Cilella, "Wheaton wants to hear residents' opinions on garbage collection," Daily Herald, pp. n/a, 2016 (Year: 2016).*

J. K. Visich, S. Li and B. M. Khumawala, "Enhancing Product Recovery Value in Closed-loop Supply Chains with RFID," J. Manage. Issues, vol. 19, (3), pp. 436-452,314, 2007 (Year: 2007).*

J. J. Nativi and S. Lee, "Impact of RFID Information Sharing in a Green Supply Chain," IIE Annual Conference. Proceedings, pp. 1-6, 2010 (Year: 2010).*

C. Luttropp and J. Johansson, "Improved recycling with life cycle information tagged to the product," J. Clean. Prod., vol. 18, (4), pp. 346-354, 2010 http://dx.doi.org/10.1016/j.jclepro.2009.10.023 (Year: 2010).*

W. Penga and D. Sub, Development of an Online System for Recycling Consumer Electronic Products using the Internet, Nfc and Rfid Technologies. 2014 http://dx.doi.org/10.4028/www.scientific.net/KEM.572.90 (Year: 2014).*

Anonymous "New Product News: New ArmorBin Commercial Containers are Offered with RFID Identification Chip Tracking System," Newstex Trade & Industry Blogs, pp. n/a, 2018 (Year: 2018).*

International Search Report and Written Opinion issued in PCT/EP2020/057167 mailed on Apr. 29, 2020.

Office Action in Japanese Application No. 2021-557751 dated Dec. 26, 2023.

* cited by examiner

FOOD PACKAGE RECYCLING APPARATUS AND METHOD

TECHNICAL FIELD

The invention generally relates to the field of package traceability. More particularly, it is related to a method for tracing a food package, a method for facilitating that a food package is placed in a package collecting device associated with a recycling material corresponding to a package material of the food package, a method for assuring that a food package associated to a user is placed in a package collecting device associated with a recycling material corresponding to a package material of the food package, a server configured to trace a package, a package collecting device, a user device and a system.

BACKGROUND ART

Today consumers worldwide are increasingly interested in how food products are produced and processed. This interest also includes how the food products are packaged, e.g. if packages that are renewable are used, and how the food products are transported. Finally, and most important to some customers, this includes how the packages once they are emptied are taken care of. This interest comes from an underlying trend that consumers are increasingly interested in what they and their families eat and drink to assure that they can stay healthy. Another trend also fueling this interest is that many consumers want to buy and consume food products that are environmentally sustainable.

The interest of the consumers is reflected by food producers' interest. Therefore, in addition to be able to produce food products that are tasty and healthy, food producers also want to offer consumers transparency to make sure that they can be assured that the food products live up to their promises. To provide full transparency it is required that the food products can be traced from farm to store shelf.

To make sure that the food products can be traced it is today known to provide individual packages with unique identification codes, for instance by using RFID tags. A drawback with RFID technology and many other technologies for providing individual identifications is that these add extra costs to the packages and thereby also to the food products. Therefore, even though the technology for achieving individual tracing of packages has been around for quite some time, a major commercial break-through is yet to come. Recently, new technologies, such as RFID tags printed onto the packages, have been presented that may be overcome the hurdle of cost, but at this point of time food packages with individual identification tags still only represent a fraction of a total amount of food packages produced.

In addition to cost, which is often presented as the major reason for not having food packages with individual identification tags in large scale, another reason for that the packages are not traced down to package level is that a complex network of companies and different types of equipment are involved in providing for that the food products are brought from the farm to the store shelf. This means that in order to be able to trace food products all companies involved in handling these must invest and maintain equipment providing tracing capabilities.

Therefore, even though there today exist technologies that can be used for tracing packaged food products, there is a need to adapt the technologies as such to become more cost efficient, but also how these are used to provide for that tracing is made possible. This especially holds true for later stages of the life cycle of the food products, such as when the emptied packages are to be recycled.

SUMMARY

It is an object of the invention to at least partly overcome one or more of the above-identified limitations of the prior art. In particular, it is an object to provide a method for enabling efficient recycling in terms of cost as well as technical complexity.

In short, it is suggested that in a first phase of the product life cycle a package identification is associated to a user identification, e.g. when a food product provided in a food package is purchased by a user. Another option to associate the two is to do this at the same time as the user reads the package identification for receiving product information from a server by e.g. using her mobile phone associated to the user identification.

In a second phase of the life cycle the package identification can be read by a package collecting device and the user identification can be associated to a recycling event. Since the package identification is both linked to the user identification and the recycling event, the recycling event can be associated to the user identification, which in turn provides for that a recycling confirmation can be sent to the user linked to the user identification. In addition to achieving a better understanding of which packages that are recycled and which are not, the suggested approach enables recycling reward systems that increase recycling levels and thereby reduces the environmental impact.

Unlike technologies that are based on the idea of continuously tracing the food product and the package throughout all steps from packaging the food product to recycling the food package, the suggested approach herein suggests a more cost efficient and in many aspects less complex process. The food package can namely be linked to the user identification in the first phase, e.g. when the user is buying the food product held in the food package, and then not until the food package is placed in the package collecting device, the package identification can be read again. By using a server communicatively connected to both a user device linked to the user identification and to the package collecting device, the user identification can be linked to the recycling event by making use of that both are linked to the package identification.

A further advantage is that by linking the package to the user identification in the first phase it is made possible to keep track of how many packages bought by the user that is recycled, which is not possible to obtain with the solutions of today.

According to a first aspect it is provided a method for tracing a food package for assuring efficient recycling. The method may comprise establishing a first communication session between the food package and a user device, receiving a user identification associated to the user device, receiving a package identification from a package identification device provided in the food package, establishing a second communication session between the food package and a package collecting device (PCD), receiving a PCD identification from the package collecting device, determining package material associated with the food package by using the package identification, determining recycling material associated with the package collecting device by using the PCD identification, in case the package material and the recycling material match, in case a package disposal is detected by the package collecting device, registering a recycling confirmation to a user account associated with the user identification.

The method may further comprise transferring to the package collecting device an acceptance signal if the package material and the recycling material match, or transferring to the package collecting device a rejection signal if the package material and the recycling material differ.

The method may further comprise providing information via a user interface provided on the package collecting device in response to the acceptance signal or the rejection signal.

The method may further comprise in response to receiving the package identification and the user identification, transferring product information related to the package identification to the user device.

The user identification may be read from the user device by the food package and stored in a food package memory, and transferred from the food package memory to the package collecting device.

The package identification may be transferred from the food package to the user device during the first communication session, and the user identification and the package identification are transferred from the user device to a server, and the package identification may be transferred from the food package to the package collecting device during the second communication session, and the package identification and the PCD identification may be transferred from the package collecting device to the server.

The method may further comprise receiving a carrier identification associated to a carrier, such as a truck, from the carrier, associating the package identifications of packages disposed in the package collecting device to the carrier identification.

The package identification may be read from the package identification device provided in the food package and associated to the user identification as part of a purchasing process.

According to a second aspect it is provided a method for facilitating that a food package is placed in a package collecting device associated with a recycling material corresponding to a package material of the food package. The method may comprise receiving a package identification by reading a package identification device of the food package using a PCD control unit, transferring the package identification and a PCD identification to a server, receiving from the server an acceptance signal if the package material and the recycling material match, or a rejection signal if the package material and the recycling material differ, in case the acceptance signal is received, detecting if the food package is disposed in the package collecting device, in case the food package is disposed in the package collecting device, transferring a package disposal signal from the package collecting device to the server.

The method may further comprise storing the package identification in a memory of the package collecting device, and transferring the PCD identification and the food package identification to the carrier.

According to a third aspect it is provided a method for assuring that a food package associated to a user is placed in a package collecting device associated with a recycling material corresponding to a package material of the food package. The method may comprise receiving a package identification by reading a package identification device of the food package using a user device associated with the user, transferring the package identification and a user identification from the user device to a server, and receiving from the server by the user device a recycling confirmation.

According to a fourth aspect it is provided a server configured to trace a food package for assuring efficient recycling. The server may comprise a memory, a control unit, and a transceiver, wherein the transceiver may be configured to: during a first a first communication session between the food package and a user device, receive a user identification associated to the user device, and receive a package identification from a package identification device provided in the food package, during a second communication session between the food package and a package collecting device, receive a PCD identification from the package collecting device, receive a package disposal signal confirming that a package disposal is detected, transfer a recycling confirmation to a user account associated with the user identification in case a package material and a recycling material match and in case the package disposal is detected, wherein the control unit is configured to: execute a package material determination function to determine package material associated with the food package by using the package identification; execute a recycling material determination function to determine the recycling material associated with the package collecting device by using the PCD identification, and execute a package material to recycling material comparison function to determine whether or not the package material and the recycling material match.

According to fifth aspect it is provided a package collecting device configured to facilitate that a food package is placed in a package collecting device associated with a recycling material corresponding to a package material of the food package. The package collecting device may comprise a memory, a PCD control unit, and a transceiver, wherein the transceiver is configured to: receive a package identification by reading a package identification device in the food package, transfer the package identification and a PCD identification to a server, receive from the server an acceptance signal if the package material and the recycling material match, or a rejection signal if the package material and the recycling material differ, transfer a package disposal signal confirming that a package disposal is detected, wherein the PCD control unit is configured to: execute a package identification reader function to read a package identification device of the food package, and execute a package disposal detection function to detect if the food package is disposed in the package collecting device.

According to a sixth aspect it is provided a user device configured to assure that a food package associated with a user is placed in a package collecting device associated with a recycling material corresponding to a package material of the food package. The user device may comprise a memory, a control unit, and a transceiver, wherein the transceiver is configured to: transfer a package identification associated with the food package and a user identification associated with the user device to a server, and receive from the server a recycling confirmation once the food package has been recycled, wherein the control unit is configured to: execute a package identification reader function to read a package identification device of the food package, and execute a recycling confirmation handling function to receive a recycling confirmation.

According to a seventh aspect it is provided a system comprising a server according to the fourth aspect, at least one package collecting device according to the fifth aspect and at least one user device according to the sixth aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
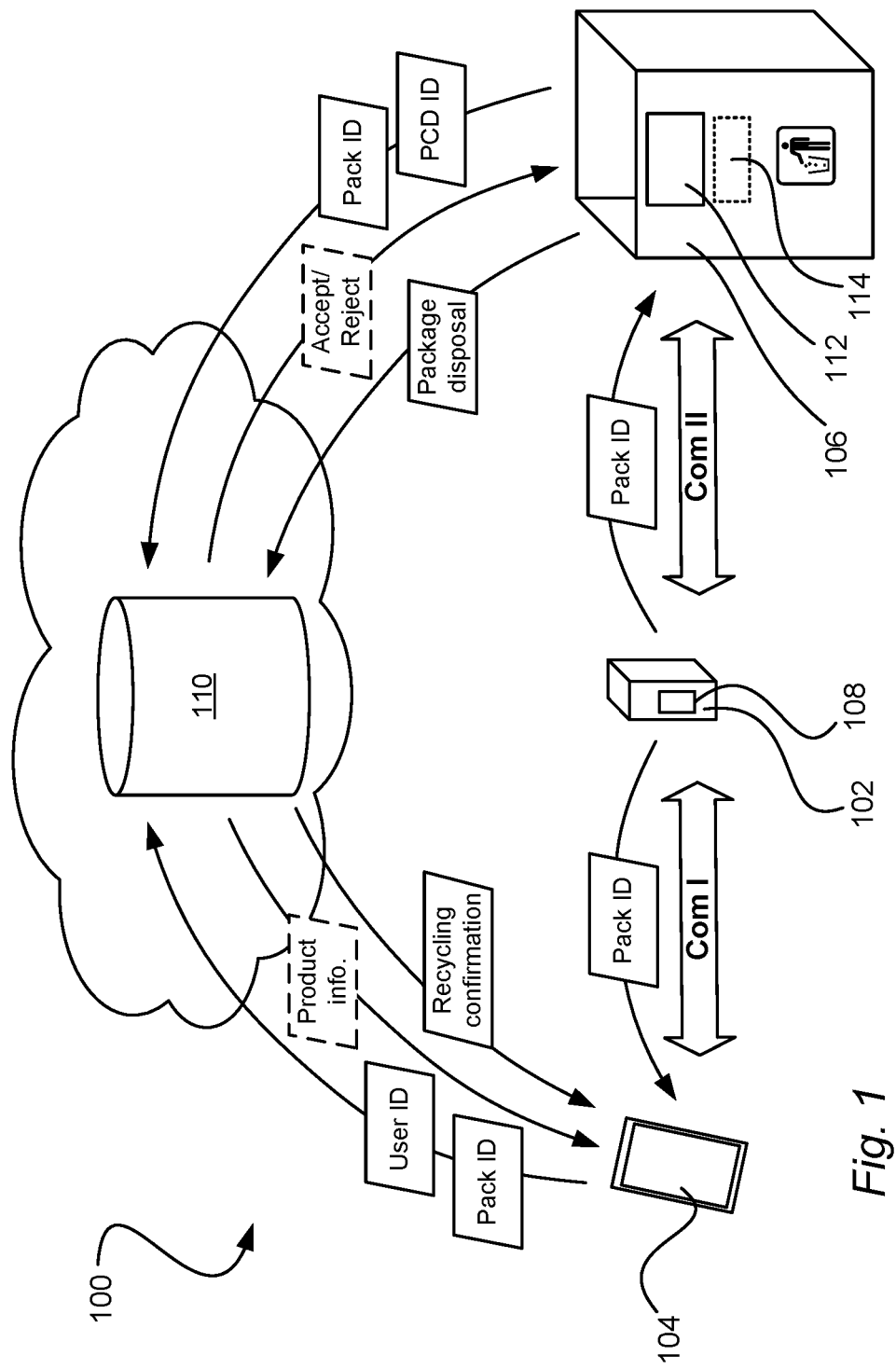
FIG. 1 illustrates a system for associating a user identification to a package identification for recycling purposes.

With reference to FIG. 1, a system 100 for tracing a food package 102 for assuring efficient recycling is illustrated. More particularly, the system 100 can comprise a user device 104, such as a mobile phone, and a package collecting device 106, such as a bin. Both the user device 104 and the package collecting device 106 can be communicatively connected to the package 102 such that a package identification can be retrieved from a package identification device 108 provided in or on the package 102.

The package identification can be retrieved by the user device 104 during a first communication session, Com I. This may be achieved by that electromagnetic radiation emitted by the user device 104 energizes the package identification device 108, which may be a passive RFID tag, such that the package identification is transmitted from the package identification device 108, where the package identification is stored, to the user device 104. Even though passive RFID technology is provided as an example, other technologies can be used as well, such as active RFID tags, near field communication (NFC) technology or a combination of RFID and NFC.

Reading the package identification device 108 by the user device 104 may be made for the sole purpose of linking the package 102 to a user linked to the user device 104 for recycling purposes, such as recycling reward systems, but it may also form part of other processes. For instance, if the user is interested to receive additional information of a food product held in the package, or of the package as such, the user may read the package identification device and forward the package identification together with a request for additional information to a server 110 that holds the additional information, such as product information. In response to the request, the server 100 may transfer the additional information related to the food product held in the package to the user device 104. In connection with this, a question may be posed to the user if he or she would like to link the package 102 to his or her recycling reward account. If affirmative, the user identification may also be provided from the user device 104 to the server 110 such that a link between the user identification and the package identification is made in the server 110. The linking of the package identification to the user identification may also be made automatically, that is, without posing any question to the user.

Another option is that the user device 104 is a credit card belonging to the user. As part of a purchasing process, the package identification of the package 102 may be read by a cashier and as part of a payment process the user may be asked if he or she would like to link the package 102 to his or her recycling reward account, which is made possible by linking the package identification to the user identification. As above, this may also be made automatically without posing questions to the user.

Still an example is that the user device 104 is a so-called smart fridge, i.e. a refrigerator that can identify the food products held in the refrigerator in order to e.g. inform the user when a certain food product is close to due date or to automatically create grocery shopping lists. In addition to these smart fridge features, the smart fridge may transfer the package identification and the user identification to the server 110 for linking the user to the package for recycling purposes. Another example is a car having a built-in reader such that the package identification can be read and linked to the user identification via the car, e.g. when driving home from the grocery store.

As can be understood from above, any device directly or indirectly linked to the user identification may be used as the user device 104, also a combination of devices may be used.

Once the food product has been consumed and the food package 102 is emptied and brought to the package collecting device 106 a second communication session, Com II, can be established between the package 102 and the package collecting device 106. In case the package identification device 108 is embodied as the passive RFID tag, as provided by way of example above, the second communication session may be established by that a PCD control unit 112 energizes the package identification device 108 such that the package identification is transmitted from the package 102 to the package collecting device (PCD) 106.

After having read the package identification from the package identification device 108, the package collecting device 106 can transfer the package identification and a PCD identification, held in a PCD identification device in the package collecting device 106, to the server 110. In the server 110, package material, that is, the material of which the package is made, e.g. carton, can be compared with recycling material, that is, the material the package collecting device is to collect, e.g. carton. In case, the materials match an acceptance signal may be transmitted from the server 110 to the package collecting device 106, otherwise a rejection signal may be transmitted. The acceptance signal and the rejection signal may be transmitted to a user interface 114, e.g. LEDs in different colors, provided on the package collecting device 106 such that it can be made clear to the user if the package is placed in a correct package collecting device, i.e. in the package collecting device 106 with a recycling material corresponding to the package material. Even though the example above is directed towards one recycling material for the package collecting device 106, it should be noted that one and the same package collecting device may be linked to a plurality of recycling materials. For instance, the package collecting device 106 may be set to collect both carton and plastic, and at a later stage of the recycling process carton and plastic items may be divided in different bins.

In case the recycling material and the package material match, and it is detected that the package is disposed in the package collecting device 106 e.g. by having a slit combined with a photo detector in the package collecting device 106 or other sensor arrangement, a package disposal signal can be transferred from the package collecting device 106 to the server 110. In response to the package disposal signal, the server 110 may transmit a recycling confirmation to the user device 104. As described above, if the recycling confirmation is linked to the recycling reward system, this may also imply that a reward linked to a user account of the user is issued.

Even though illustrated that the package material and the recycling material are compared in the server, this comparison may also be made in the package collecting device, more particularly by the PCD control unit 112 if the information is provided to the package collecting device 106. It is also possible to have part of the information available in the server 110 stored in the PCD control unit 112 in order to be able to handle situations when communication cannot be established between the package collecting device 106 and the server 110.

An advantage with this approach is that it is not needed to bring the user device 104 to the package collecting device 106 when disposing the package 102 for recycling. Further, by being able to associate the package 102 both to the user device 104, as well as a time and location for the first communication session, and to the package collecting device, as well as time and location for the second communication session, data may be collected that can be used for improving recycling possibilities.

Further, even if not illustrated, in case the user bringing the package 102 to the package collecting device 106 carries the user device 104, the user identification may also be read by the package collecting device 106. By doing so, it can be detected which user that is registering the package identification during the first communication session, and which user that is bringing the package to the package collecting device 106.

To keep track of the package identification and its associated data, a distributed ledger may be used. In addition to the distributed ledger, other elements of block chain technology may be used as well.

Figure 2:
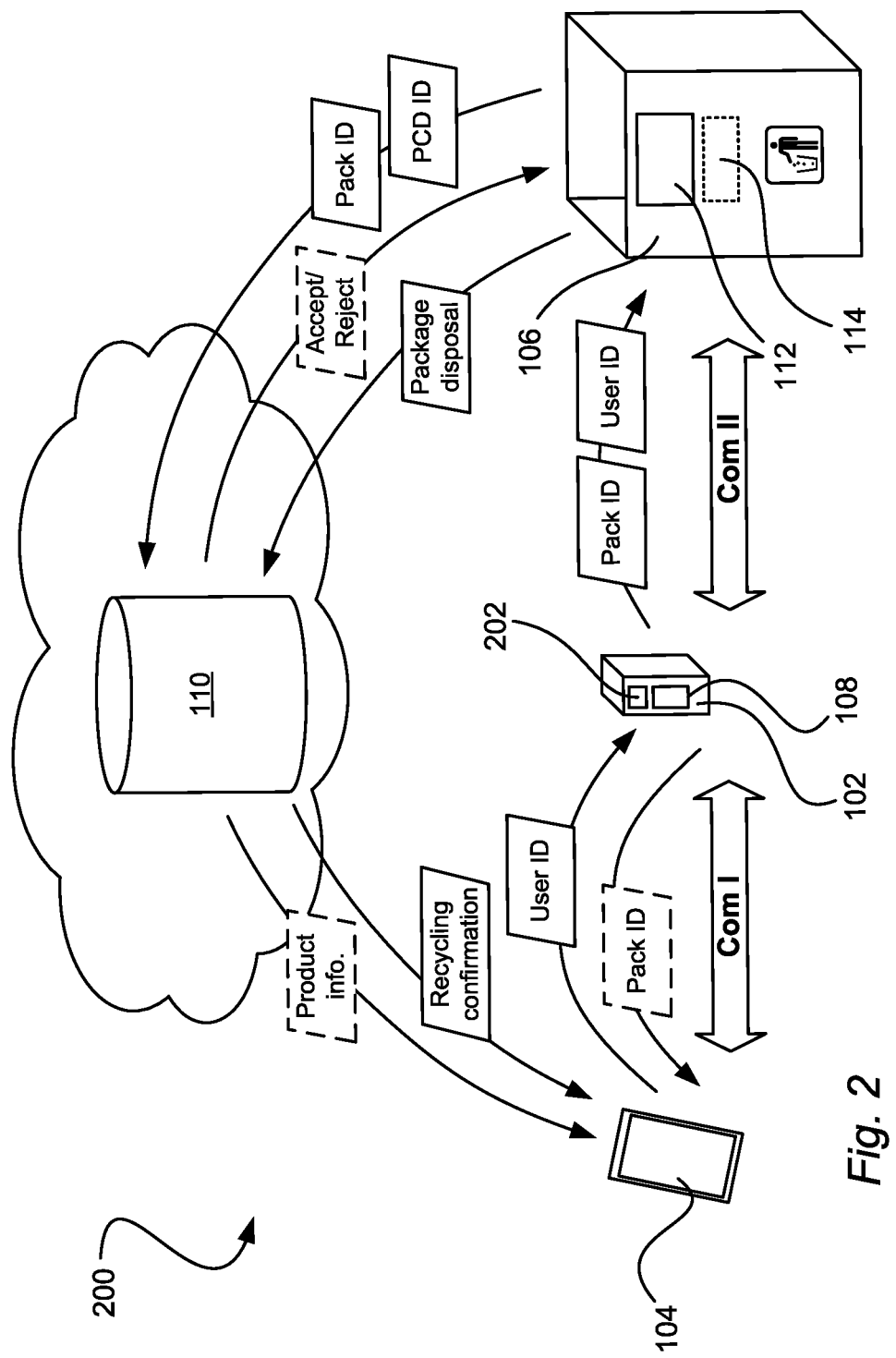
FIG. 2 illustrates another system, being an alternative to the system illustrated in FIG. 1.

FIG. 2 illustrates another system 200 for tracing the food package 102 for assuring efficient recycling by way of example. The system 200 illustrated in FIG. 2 is in many aspects similar to the system 100 illustrated in FIG. 1, but unlike the system 100 illustrated in FIG. 1 the food package 102 is provided with a memory 202, such as an electrically erasable programmable read-only memory (EEPROM), for holding the user identification. An advantage with this is that the user device 104 does not need to be communicatively connected to the server 110 during the first communication session. Once the first communication session is established in the system 200, illustrated by way of example in FIG. 2, the user identification can be transferred from the user device 104 to the package 102 and stored in the memory 202. During the second communication session, the package identification can be transferred from the package 102 to the package collecting device 104, in line with the system 100 illustrated in FIG. 1, but also the user identification stored in the memory 202 can be transmitted. Put differently, the package 102 can carry the user identification up until the package 102 is to be recycled. In line with the system 100 illustrated in FIG. 1, also in the system 200 it is not necessary for the user to carry the user device 104 when disposing the package 102 in the package collecting device 106. Even though not required, the package identification may optionally be transferred from the package 102 to the user device 104 during the first communication session.

Since communication with the server 110 adds extra costs in terms of e.g. additional equipment, the suggested approach embodied by the system 200 illustrated in FIG. 2, may be further expanded to also include the package collecting device 106. More particularly, it is possible to design a system 300, illustrated in FIG. 3, such that communication between the package collecting device 106 and the server 110 also can be omitted. In addition to the system 200, illustrated in FIG. 2, the package collecting device 106 of the system 300 is namely provided with a memory 302 for storing the user identification and the package identification. If having the user interface 114, provided to signal to the user whether or not the package 102 is placed in the package collecting device 106 correctly, an internal database may be used.

Figure 3:
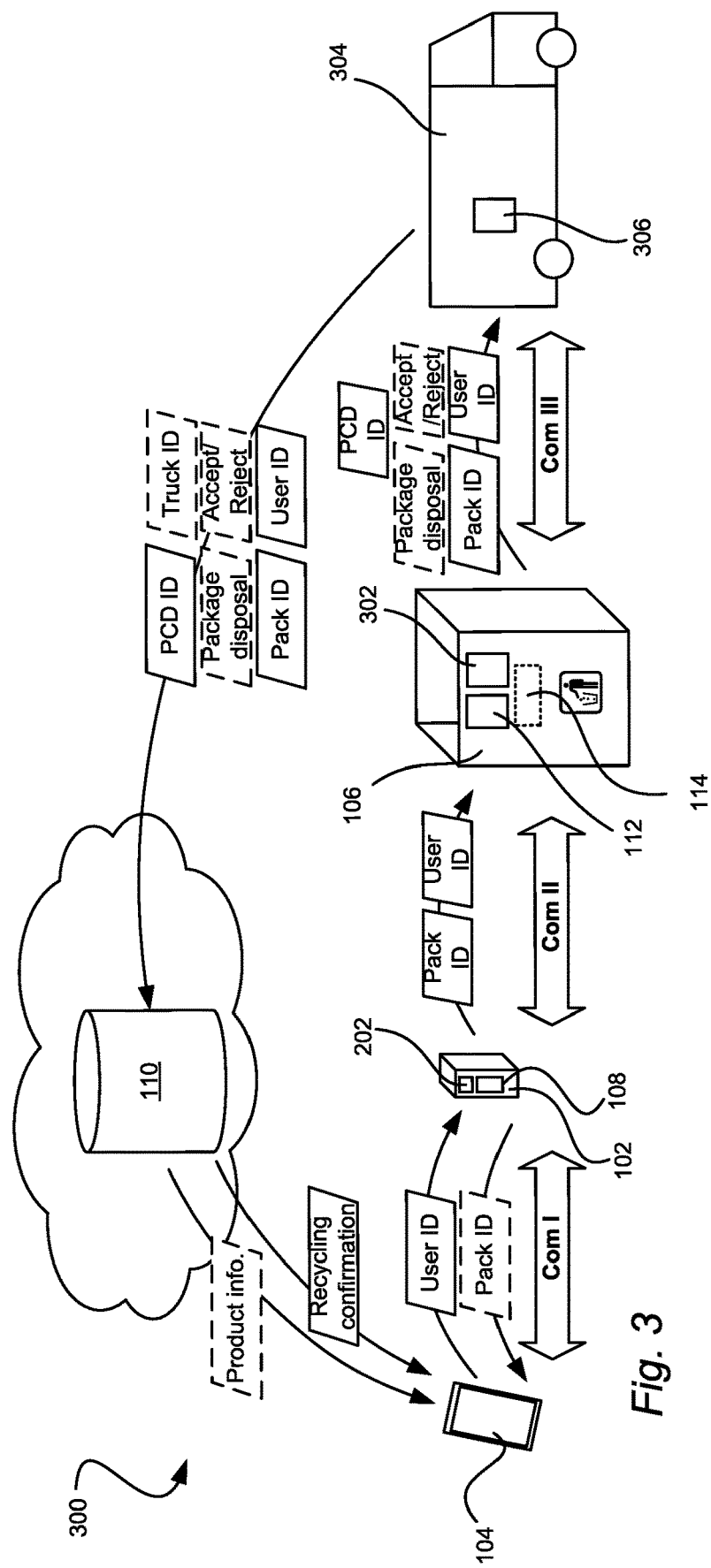
FIG. 3 illustrates yet another system, being an alternative to the systems illustrated in FIGS. 1 and 2.

In the example illustrated in FIG. 3, once the package collecting device 106 is emptied, a third communication session, Com III, can be established between the package collecting device 106 and a carrier 304, such as a truck or a container in which packages from a plurality of package collecting devices can be collected. During the third communication session, the user identification, having been stored both in the memory 202 of the package 102 and the memory 302 of the package collecting device 106, the package identification, having been stored in the memory 302, and the PCD identification can be transferred from the package collecting device 106 to the carrier 304. Optionally, in addition, the package disposal signal and the acceptance or rejection signal may be transferred. The package disposal signal, the acceptance or rejection signals and user identification can be linked to the package identification. From the carrier 304, by using a carrier control unit 306, data received from the package collecting device 106 together with a carrier identification can be transferred to the server 110.

As described above, aggregating data, as suggested by the examples illustrated in FIGS. 2 and 3, can provide a more cost efficient system since less components need to be communicatively connected to the server 110. However, even if the costs involved for making the user device 104 and the package collecting device 106 communicatively connected to the server 110 may be reduced in the not so distant future by the introduction of new technologies, the aggregation of data still serves a purpose. By storing data in the package 102 and in the package collecting device 106, as illustrated in FIGS. 2 and 3, redundancy is namely provided as well as increased stability. Thus, by having data storing capabilities in the package and the package collecting device, the system will continue to run even though e.g. communication between the package collecting device 106 and the server 110 is down.

Figure 4:
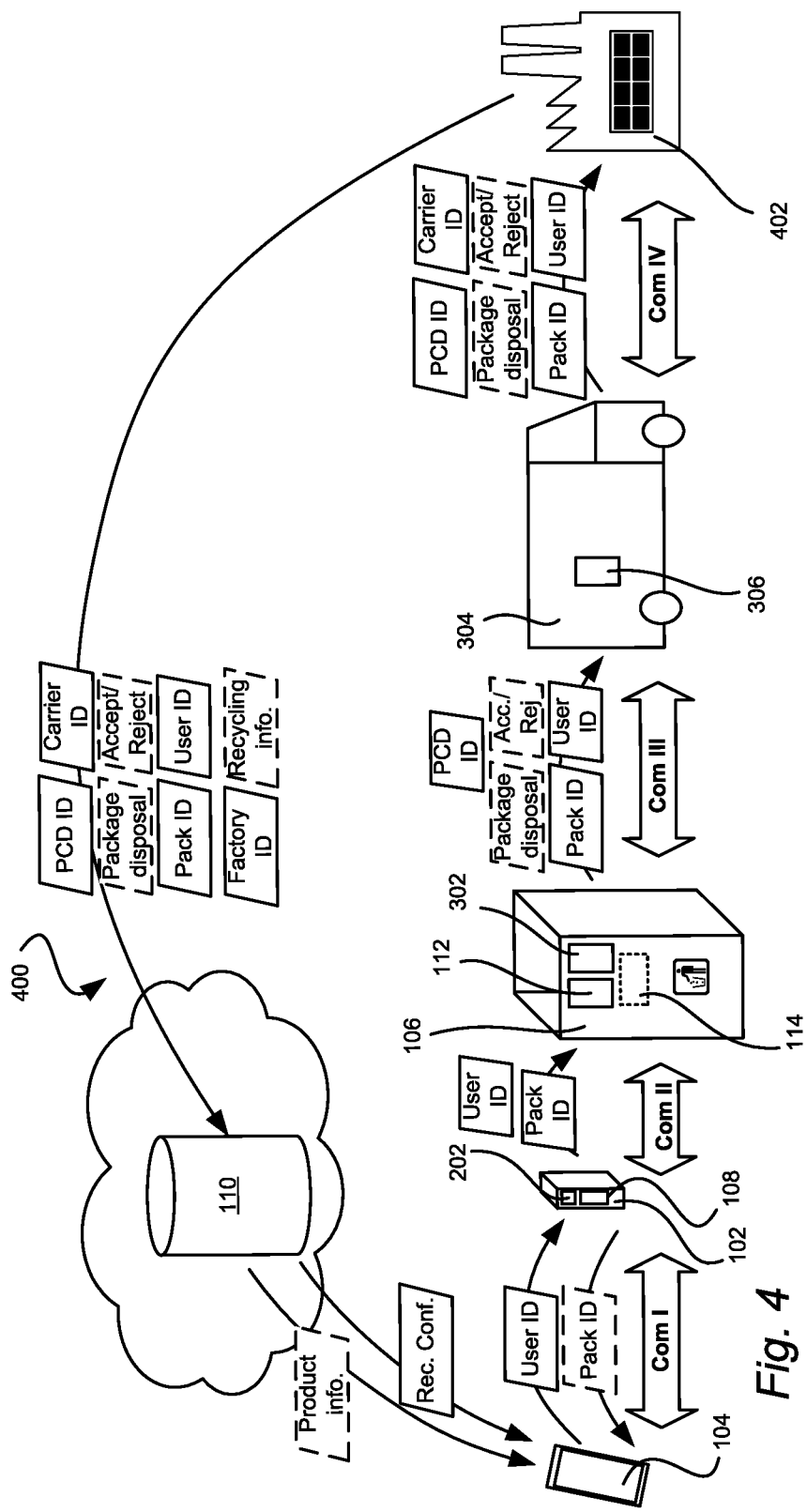
FIG. 4 illustrates a further system, being an alternative to the systems illustrated in FIGS. 1, 2 and 3.

FIG. 4 illustrates, by way of example, a system 400 that is an extension of the system 300 illustrated in FIG. 3. In addition to the system 300 illustrated in FIG. 3, the system 400 further comprises a recycling factory 402 with which the carrier 304 can establish a fourth communication session, Com IV. During the fourth communication session, the data transmitted from the package collecting device 106 to the carrier 304 as well as a carrier ID may be transmitted from the carrier 304 to the recycling factory 402. From the recycling factory 402 to the server 110, data transmitted from the carrier 304 to the recycling factory 402 as well as a factory identification can be transmitted.

Further, recycling information, gathered during a recycling process in the recycling factory 402, may be transmitted from the recycling factory 402 to the server 110. An advantage with this is that the recycling confirmation transmitted from the server 110 to the user device 104 may be more than a binary statement indicating whether or not the package 102 was placed in the package collecting device 106. For instance, it may be described to what extent the package 102 was possible to recycle.

In case the package collecting device 106 is intended to receive different recycling materials, e.g. if the package collecting device is intended to receive both plastics and carton, the system 400 illustrated in FIG. 4 may prove efficient. With this system 400 articles of different materials dispatched in the package collecting device 106 may namely be handled together up until the recycling factory 402. In the recycling factory 402 the articles can be sorted based on material such that articles of different material can be handled separately. As part of this process the package identification may be read such that the package identification can be linked to a material and/or a quality assessment, i.e. an assessment of to which degree the package 102 can be recycled.

Handling a plurality of different materials in one and the same package collecting device 106 may prove relevant if the package collecting device is placed in a household. By being able to have many different materials in the same bin, fewer package collecting devices may be needed, which will save space.

Also in case the package collecting device 106 is a vending machine for collecting used packages placed in a store, it may be advantageous if the package collecting device can handle a plurality of different materials since less equipment is needed for the store to house and maintain.

The package 102 may be a primary package, i.e. a package holding the food product directly, e.g. Tetra Brik™ marketed by Tetra Pak™, but also a second package, e.g. a cardboard tray, or any other arrangement for holding primary packages, it can also from this aspect be advantageous to have the package collecting device 106 arranged to handle different materials. Having the package collecting device 106 set to receive a number of different materials may namely provide for that both primary packages and secondary packages can be disposed in the same package collecting device.

Figure 5:
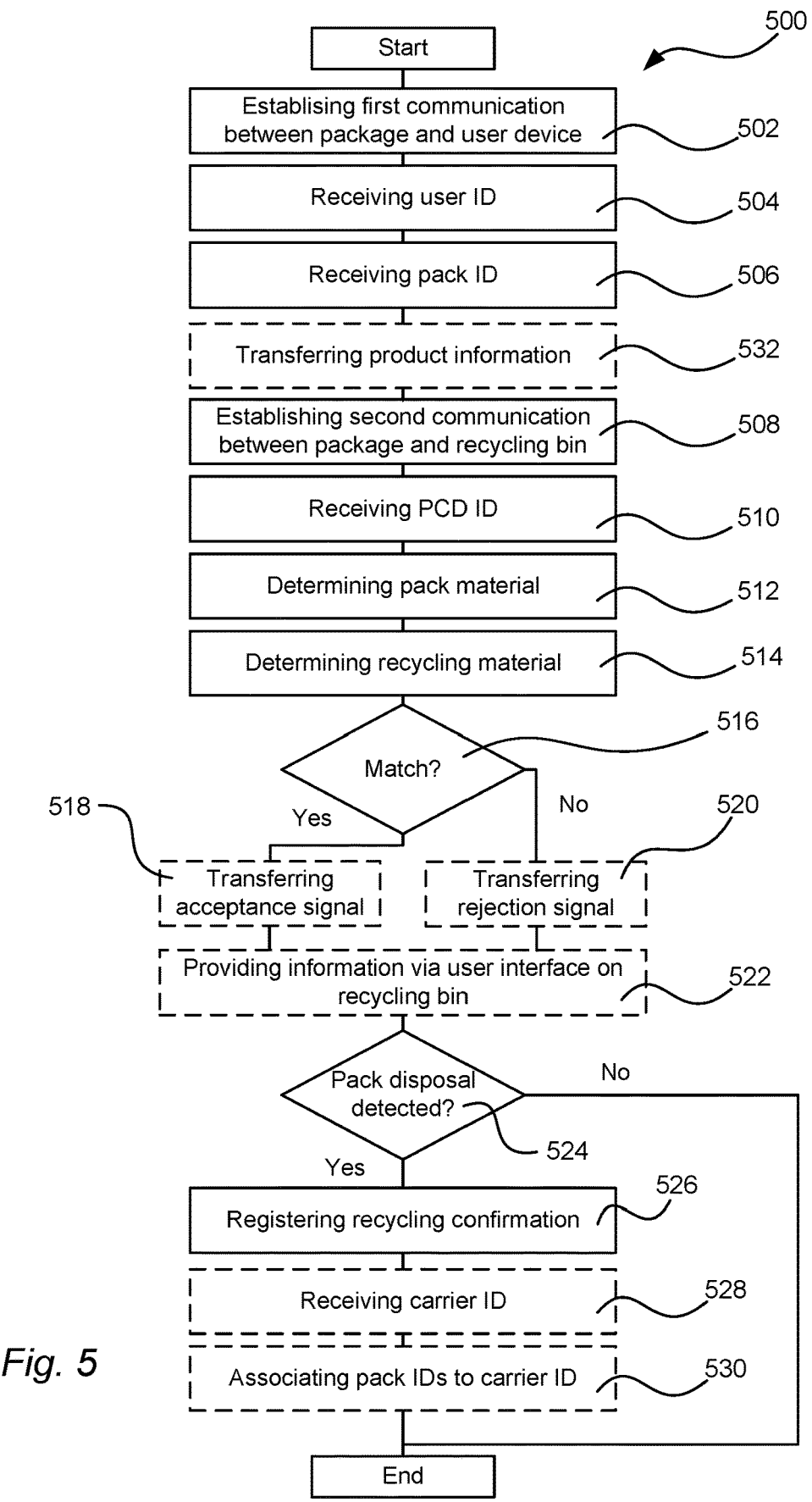
FIG. 5 is a flowchart illustrating a method for tracing the package that can be performed in a server.

FIG. 5 is a flowchart generally illustrating a method 500 for tracing the food package 102 for assuring efficient recycling that can be performed by the server 110. In a first step 502, the first communication session can be established between the food package 102 and the user device 104. After having established communication, in a second step 504, the user identification associated to the user device 104 can be received. Further, in a third step 506, the package identification can be received.

At a later point of time, in a fourth step 508, a second communication session can be established the package 102 and the package collecting device 106. After having established communication, in a fifth step 510, the PCD identification can be received.

The PCD identification may be transmitted directly from the package collecting device to the server 110, as illustrated in FIG. 1, or the PCD identification may be indirectly transmitted to the server 110, e.g. via the carrier 304, as illustrated in FIG. 3 or via the carrier 304 and the recycling factory 402, as illustrated in FIG. 4. In a similar manner, the user identification may be transmitted directly to the server, as illustrated in FIG. 1, or the user identification may be transmitted indirectly to the server 110 via e.g. the package collecting device 106, as illustrated in FIG. 2.

In a sixth step 512, the package material may be determined. This may be achieved by comparing the package identification to a database in which package identifications and their associated package material are provided. In a seventh step 514, the recycling material, i.e. the material the recycling material is intended to receive, may be determined, e.g. by comparing the PCD identification to a database of PCD identifications and associated recycling material.

In an eighth step 516, the package material and the recycling material can be compared and in case the two match, the acceptance signal can be transferred in a ninth step 518, or if the two differ the rejection signal can be transferred in a tenth step 520. The acceptance or rejection signal may be transmitted to the package collecting device 106 such that, in an eleventh step 522, information may be provided to the user via the user interface, e.g. LEDs provided on the package collecting device.

In case a package disposal is detected, in a twelfth step 524, the recycling confirmation can be registered, in a thirteenth step 526. Optionally, the carrier identification, i.e. an identification of the carrier collecting the packages in the package collecting device, can be received, in a fourteenth step 528, and associated with the packages in the package collecting device, in a fifteenth step 530. The fourteenth and fifteenth steps 528, 530 may be performed after the recycling confirmation is registered, and also provided to the user via e.g. the user device, but as illustrated in FIGS. 3 and 4, the recycling confirmation may also be registered after the fourteenth and fifteenth steps 528, 530.

Even though presented in a certain order, the different steps may be performed in other orders as well.

Figure 6:
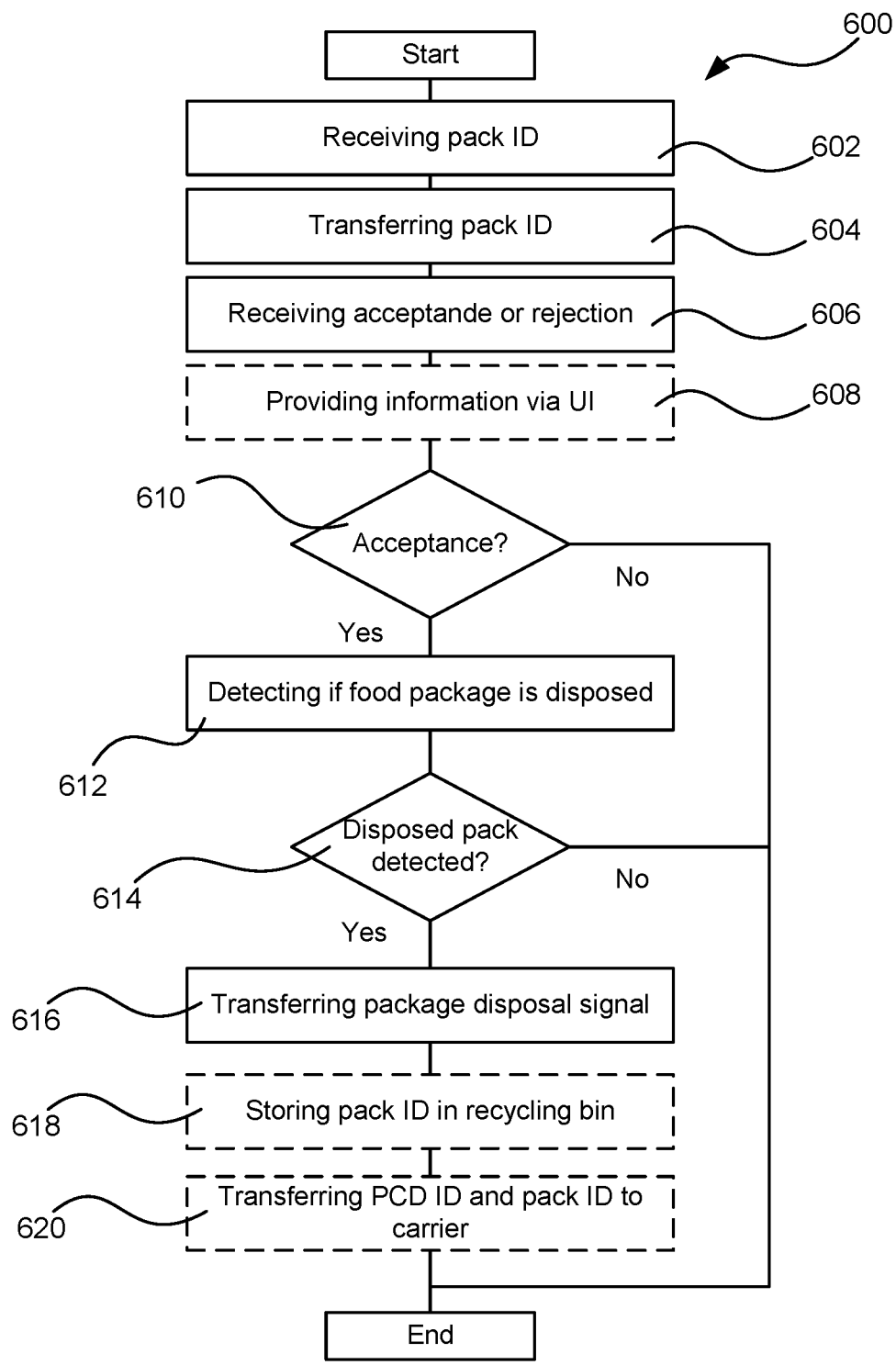
FIG. 6 is a flowchart illustrating a method that can be performed in the package collecting device.

FIG. 6 is a flowchart illustrating a method 600 for facilitating that the food package is placed in the package collecting device associated with the recycling material corresponding to the package material of the food package that can be performed in the package collecting device 106.

In a first step 602, the package identification can be received by reading the package identification device 108 of the food package 106 using the PCD control unit 112.

Next, in a second step 604, the package identification and the PCD identification can be transferred to the server 110.

Thereafter, in a third step 606, the acceptance signal if the package material and the recycling material match or the rejection signal if the package material and the recycling material differ can be received from the server 110.

Optionally, in a fourth step 608, the acceptance or the rejection signal may be reflected by the user interface of the package collecting device such that the user is provided with visual feedback.

In a fifth step 610 it can be determined if the acceptance signal has been received. If affirmative, in a sixth step 612, it can be detected whether or not the food package is disposed in the package collecting device 104. If affirmative, in a seventh step 614, the package disposal signal may be transferred in an eighth step 616.

Optionally, in an eighth step 618, the package identification can be stored in the package collecting device 106, and, in a ninth step 620, the PCD identification and the package identification can be transferred to the carrier 304, as illustrated in FIGS. 3 and 4.

Figure 7:
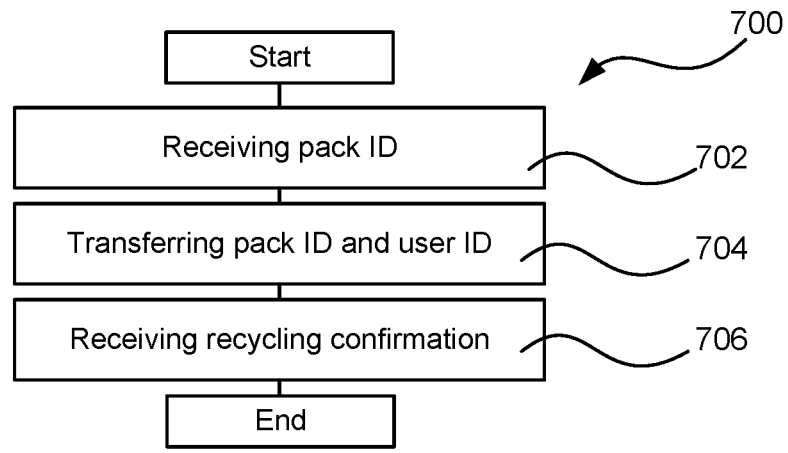
FIG. 7 is a flowchart illustrating a method that can be performed in the user device.

FIG. 7 is a flowchart illustrating a method 700 for assuring that the food package associated to the user is placed in the package collecting device 106 associated with the recycling material corresponding to the package material of the food package 102 that can be performed by the user device 104.

In a first step 702 the package identification can be received by reading the package identification device 108 of the food package 102 using the user device 104 associated with the user.

In a second step 704 the package identification and the user identification can be transferred from the user device to the server 110.

In a third step 706 the recycling confirmation from the server may be received by the user device.

Figure 8:
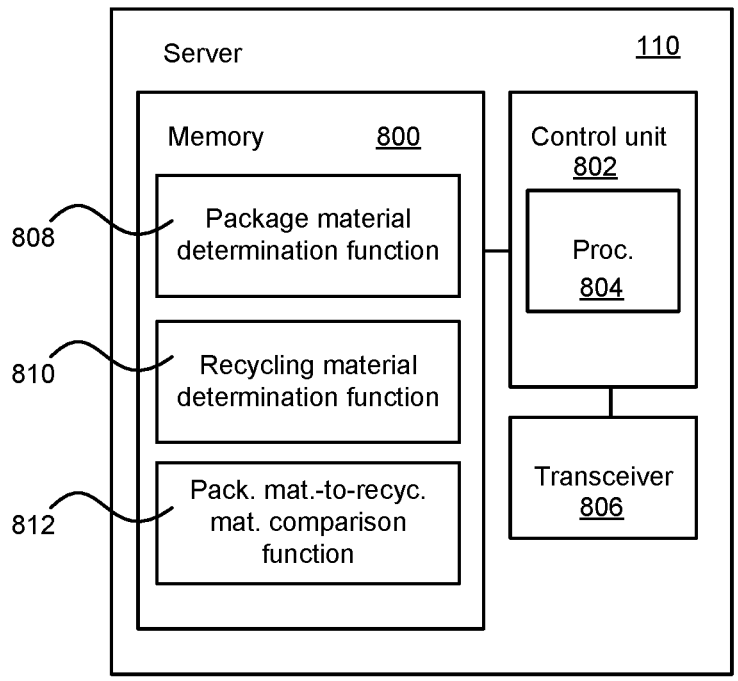
FIG. 8 illustrates the server in further detail.

FIG. 8 illustrates the server 110 in further detail by way of example. The server 110 may comprise a memory 800, a control unit 802, which in turn may comprise a processor 804, and a transceiver 806. The memory 800 may comprise a package material determination function 808 to determine the package material associated to the food package by using the package identification, a recycling material determination function 810 to determine the recycling material associated with the package collecting device 106 by using the PCD identification, and a package material to recycling material comparison function 812 to determine whether or not the package material and the recycling material match.

Figure 9:
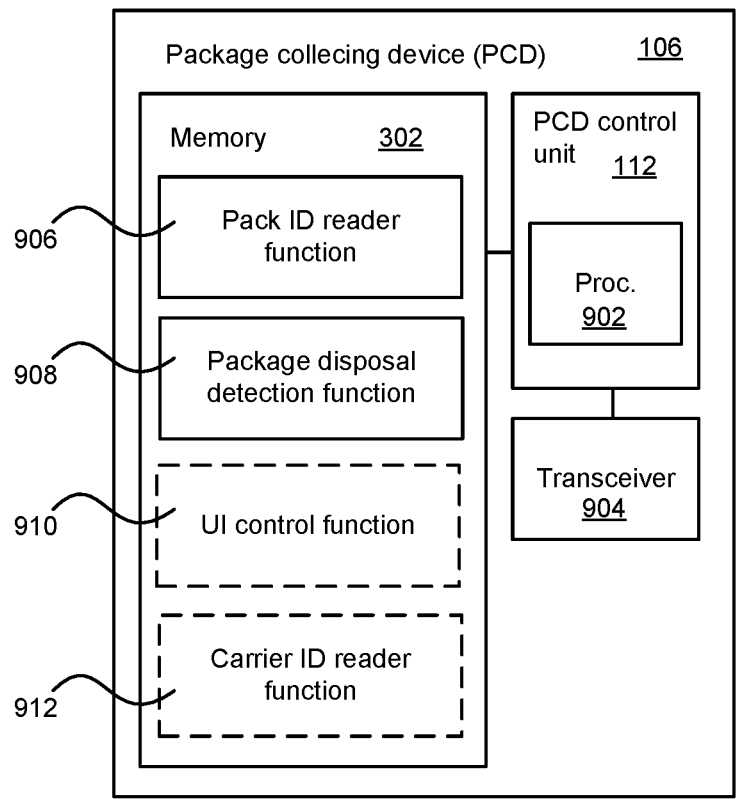
FIG. 9 illustrates the package collecting device in further detail.

FIG. 9 illustrates the package collecting device 106 in further detail by way of example. The package collecting device 106 may comprise the memory 302 and the PCD control unit 112. The PCD control unit 112 may comprise a processor 902, and it may further be provided a transceiver 904 for transmitting and receiving data.

The memory 302 may comprise a package identification reader function 906 to read the package identification of the food package 102. Further, the memory 302 may comprise a package disposal detection function 908 to detect if the food package 102 is disposed in the package collecting device.

Optionally, the memory 302 may comprise a user interface control function 910 to control the user interface 114 of the package collecting device 106 and a carrier identification reader function 912 to read the carrier identification of the carrier 304.

Figure 10:
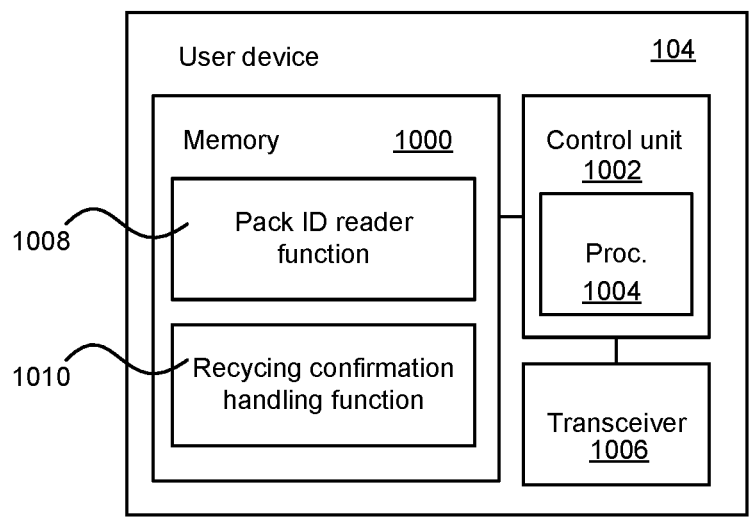
FIG. 10 illustrates the user device in further detail.

FIG. 10 illustrates the user device 104 in further detail by way of example. The user device 104, which may be a mobile device, such as a mobile phone, the smart fridge, the car or any other apparatus capable of reading the package identification and provided with the user identification.

The user device 104 may comprise a memory 1000, a control unit 1002, that may comprise a processor 1004, and a transceiver 1006.

The memory 1000 may comprise a package identification reader function 1008 to read the package identification device 108 of the food package 102, and a recycling confirmation handling function 1010 to receive the recycling confirmation.

From the description above follows that, although various embodiments of the invention have been described and shown, the invention is not restricted thereto, but may also be embodied in other ways within the scope of the subject-matter defined in the following claims.

The invention claimed is:

1. A method for tracing a food package for assuring efficient recycling, said method comprising:
    establishing a first communication session between the food package and a user device,
    transmitting to the food package, from the user device, a user identification associated with the user device,
    transmitting to the user device a package identification from a package identification device provided in the food package,
    establishing a second communication session between the food package and a package collecting device (PCD),
    transmitting to the PCD from the food package the user identification and the package identification,
    determining a package material associated with the food package by using the package identification,
    determining a recycling material designed to be accepted by the PCD by using a PCD identification from the PCD,
    determining, by the PCD, whether the package material and the recycling material match,
    establishing a third communication session between the PCD and a carrier,
    transferring the user identification and the package identification from the PCD to the carrier, and
    at a first time, responsive to the package material and the recycling material matching:
        responsive to package disposal of the food package being detected by the PCD:
            displaying on the PCD a first indication of the package material and the recycling material matching,
        responsive to transfer of the package identification from the PCD to the carrier being detected by the carrier:
            transferring to the user device, using the user identification, a first notification indicating that the food package was correctly recycled, and
            registering a recycling confirmation to a user account associated with the user identification, and
    at a second time, responsive to the package material and the recycling material not matching:
        responsive to package disposal of the food package being detected by the PCD:
            displaying on the PCD a second indication of the package material and the recycling material not matching.

2. The method according to claim 1, further comprising: in response to receiving the package identification and the user identification, transferring product information related to the package identification to the user device.

3. The method according to claim 1, wherein the user identification is read from the user device by the food package and stored in a food package memory, and transferred from the food package memory to the package collecting device.

4. The method according to claim 1, wherein:
    the package identification is transferred from the food package to the user device during the first communication session, and the user identification and the package identification are transferred from the user device to a server, and
    the package identification is transferred from the food package to the package collecting device during the second communication session, and the package identification and the PCD identification is transferred from the package collecting device to the server.

5. The method according to claim 1, wherein the package identification is read from the package identification device provided in the food package and associated to the user identification as part of a purchasing process.

6. The method according to claim 1, wherein the carrier comprises a truck.

7. The method according to claim 1, further comprising: establishing a fourth communication session between the carrier and a recycling factory, transferring the user identification and the package identification from the carrier to the recycling factory,
determining whether the package material includes at least one additional material by using the package identification,
determining whether the package material matches at least one of a plurality of recycling materials associated with the recycling factory, and
responsive to the package material matching at least one of the plurality of recycling materials associated with the recycling factory, transferring recycling information from the recycling factory to the user device or the user account associated with the user identification, wherein the recycling information comprises:
a value associated with an amount of the package material that was possible to recycle.

8. A method for facilitating that a food package is placed in a package collecting device associated with a recycling material corresponding to a package material of the food package, said method comprising:
receiving a package identification by reading a package identification device of the food package using a package collecting device (PCD) controller of a PCD,
determining whether a package material associated with the package identification matches a recycling material associated with the PCD identification by performing at least one of:
transmitting, to a server from the PCD controller, the package identification and PCD identification and determining, by the server, whether the package material matches the recycling material; or
determining, by the PCD controller, whether the package material matches the recycling material;
generating an acceptance signal responsive to the package material matching the recycling material, or a rejection signal responsive to the package material being different from the recycling material by at least one of:
receiving, from the server, the acceptance or rejection signal;
generating, by the PCD controller, the acceptance or rejection signal;
responsive to the acceptance signal:
detecting if the food package is correctly disposed in the PCD, and
responsive to detecting that the food package is correctly disposed in the PCD:
transferring a package disposal signal from the PCD controller to the server or a carrier, and
displaying on the PCD a first indication of the package material and the recycling material matching, and
responsive to the rejection signal:
displaying on the PCD a second indication of the package material and the recycling material differing.

9. The method according to claim 8, further comprising:
storing the package identification in a memory of the PCD, and
transferring the PCD identification and the food package identification to the carrier.

* * * * *